US011805488B2

United States Patent
Khoshnevisan et al.

(10) Patent No.: US 11,805,488 B2
(45) Date of Patent: Oct. 31, 2023

(54) POWER HEADROOM REPORTING FOR UPLINK COMPONENT CARRIERS

(71) Applicant: QUALCOMM Incorporated, San Diego, CA (US)

(72) Inventors: Mostafa Khoshnevisan, San Diego, CA (US); Seyedkianoush Hosseini, San Diego, CA (US); Linhai He, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 17/304,093

(22) Filed: Jun. 14, 2021

(65) Prior Publication Data

US 2022/0046555 A1    Feb. 10, 2022

Related U.S. Application Data

(60) Provisional application No. 62/706,327, filed on Aug. 10, 2020.

(51) Int. Cl.
*H04W 52/36*    (2009.01)
*H04W 80/02*    (2009.01)
(Continued)

(52) U.S. Cl.
CPC ....... *H04W 52/365* (2013.01); *H04W 52/146* (2013.01); *H04W 72/02* (2013.01); *H04W 72/0453* (2013.01); *H04W 80/02* (2013.01)

(58) Field of Classification Search
CPC . H04W 52/365; H04W 52/146; H04W 72/02; H04W 72/0453; H04W 80/02; H04W 52/34
(Continued)

(56) References Cited

U.S. PATENT DOCUMENTS 11,394,517 B2 *  7/2022  Huang ............. H04W 72/1268
2012/0083308 A1 *  4/2012  Wang .................. H04W 52/367
                                                          455/522
(Continued)

FOREIGN PATENT DOCUMENTS

CN        110536394 A      12/2019

OTHER PUBLICATIONS

"3rd Generation Partnership Project, Technical Specification Group Radio Access Network, NR, Medium Access Control (MAC) protocol specification (Release 16)", 3GPP Standard Technical Specification, 3GPP TS 38.321. 3rd Generation Partnership Project (3GPP), Mobile Competence Centre, 650, Route Des Lucioles, F-06921 Sophia-Antipolis Cedex, France, vol. RAN WG2, No. V16.1.0, Jul. 24, 2020 (Jul. 24, 2020), pp. 1-151, XP051925832, Retrieved from the Internet: URL: ftp://ftp.3gpp.org/Specs/archive/38_series/38.321/38321-g10.zip. 38321-g10.docx. [Retrieved on Jul. 24, 2020] The Whole Document.
(Continued)

*Primary Examiner* — Hassan Kizou
*Assistant Examiner* — Oladiran Gideon Olaleye
(74) *Attorney, Agent, or Firm* — Harrity & Harrity, LLP

(57) ABSTRACT

Various aspects of the present disclosure generally relate to wireless communication. In some aspects, a user equipment (UE) may detect an occurrence of a triggering event associated with power headroom reporting. The UE may transmit, from the UE to a base station, a power headroom report (PHR) medium access control (MAC) control element (CE) based at least in part on the occurrence of the triggering event, wherein the PHR MAC-CE is for one or more uplink component carriers of the UE that are associated with one or more control resource set pool index values. Numerous other aspects are provided.

30 Claims, 9 Drawing Sheets

(51) Int. Cl.
*H04W 72/0453* (2023.01)
*H04W 72/02* (2009.01)
*H04W 52/14* (2009.01)

(58) Field of Classification Search
USPC .......................................................... 370/318
See application file for complete search history.

(56) References Cited

U.S. PATENT DOCUMENTS

| | | | | |
|---|---|---|---|---|
| 2012/0087317 | A1* | 4/2012 | Bostrom | H04W 72/0453 370/329 |
| 2012/0224552 | A1* | 9/2012 | Feuersanger | H04L 5/0046 370/329 |
| 2013/0028223 | A1* | 1/2013 | Kim | H04W 72/1284 370/329 |
| 2013/0301568 | A1* | 11/2013 | Park | H04W 72/04 370/329 |
| 2013/0336228 | A1* | 12/2013 | Zhao | H04W 52/365 370/328 |
| 2014/0329551 | A1* | 11/2014 | Ryoo | H04W 76/27 455/522 |
| 2019/0082399 | A1* | 3/2019 | Loehr | H04W 72/14 |
| 2019/0349059 | A1* | 11/2019 | John Wilson | H04L 5/0094 |
| 2020/0100193 | A1* | 3/2020 | Cheng | H04W 52/146 |
| 2020/0137741 | A1* | 4/2020 | Zhou | H04L 5/0092 |
| 2020/0163031 | A1* | 5/2020 | Loehr | H04W 52/365 |
| 2020/0229104 | A1* | 7/2020 | MolavianJazi | H04W 52/54 |
| 2020/0322893 | A1* | 10/2020 | Yao | H04L 5/0051 |
| 2020/0351039 | A1* | 11/2020 | Zhou | H04W 72/044 |
| 2021/0045070 | A1* | 2/2021 | Yi | H04W 52/383 |
| 2022/0039030 | A1* | 2/2022 | Liu | H04W 80/02 |
| 2022/0046556 | A1* | 2/2022 | Lee | H04W 52/58 |
| 2022/0264589 | A1* | 8/2022 | Sun | H04W 72/1226 |

OTHER PUBLICATIONS

International Search Report and Written Opinion—PCT/US2021/070710—ISA/EPO—dated Sep. 27, 2021.

* cited by examiner

POWER HEADROOM REPORTING FOR UPLINK COMPONENT CARRIERS

CROSS-REFERENCE TO RELATED APPLICATION

This patent application claims priority to Provisional Patent Application No. 62/706,327, filed on Aug. 10, 2020, entitled "POWER HEADROOM REPORTING FOR UPLINK COMPONENT CARRIERS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for power headroom reporting for uplink component carriers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: detecting an occurrence of a triggering event associated with power headroom reporting; and transmitting, from the UE to a base station, a power headroom report (PHR) medium access control (MAC) control element (CE) based at least in part on the occurrence of the triggering event, wherein the PHR MAC-CE is for one or more uplink component carriers of the UE that are associated with one or more control resource set (CORESET) pool index values.

In some aspects, a UE for wireless communication includes a memory and one or more processors, coupled to the memory, configured to: detect an occurrence of a triggering event associated with power headroom reporting; and transmit, from the UE to a base station, a PHR MAC-CE based at least in part on the occurrence of the triggering event, wherein the PHR MAC-CE is for one or more uplink component carriers of the UE that are associated with one or more CORESET pool index values.

In some aspects, a non-transitory computer-readable medium storing a set of instructions for wireless communication includes one or more instructions that, when executed by one or more processors of a UE, cause the UE to: detect an occurrence of a triggering event associated with power headroom reporting; and transmit, from the UE to a base station, a PHR MAC-CE based at least in part on the occurrence of the triggering event, wherein the PHR MAC-CE is for one or more uplink component carriers of the UE that are associated with one or more CORESET pool index values.

In some aspects, an apparatus for wireless communication includes: means for detecting an occurrence of a triggering event associated with power headroom reporting; and means for transmitting, from the apparatus to a base station, a PHR MAC-CE based at least in part on the occurrence of the triggering event, wherein the PHR MAC-CE is for one or more uplink component carriers of the apparatus that are associated with one or more CORESET pool index values.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
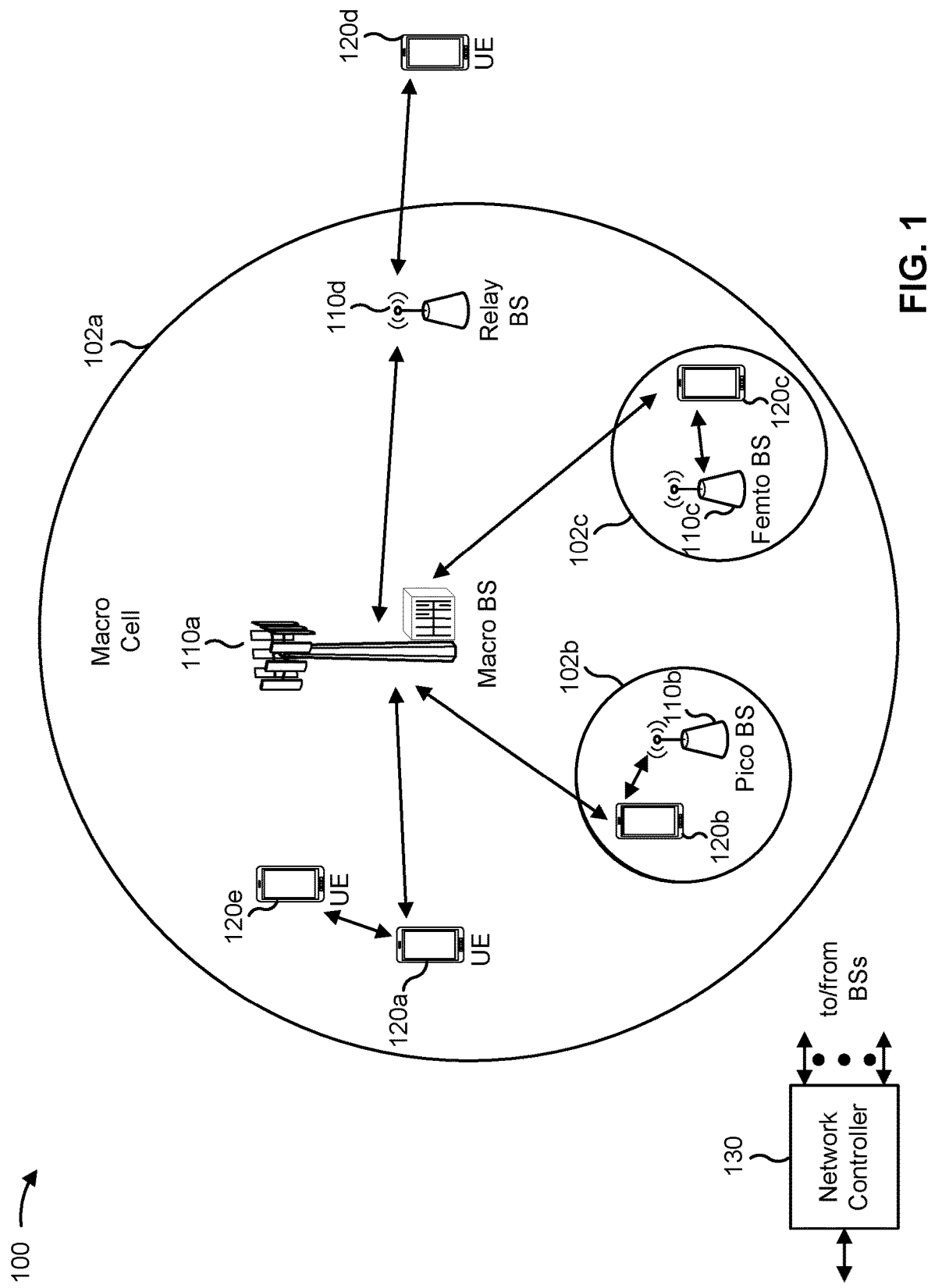
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
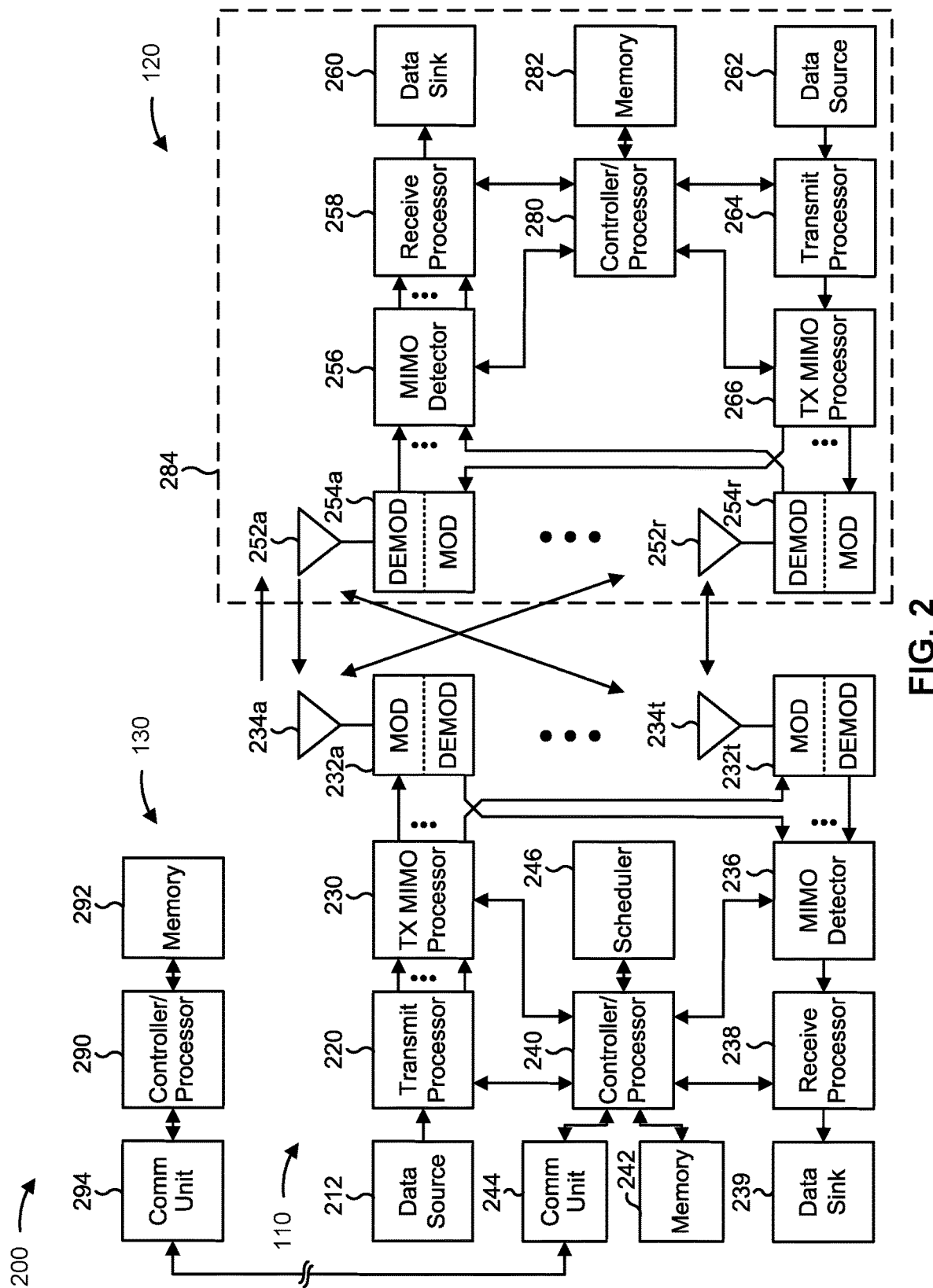
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the base station 110, the controller/processor 280 of the UE 120, and/or any other component(s) of FIG. 2 may perform one or more techniques associated with power headroom reporting for uplink component carriers, as described in more detail elsewhere herein. For example, controller/processor 240 of base station 110, controller/processor 280 of UE 120, and/or any other component(s) of FIG. 2 may perform or direct operations of, for example, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some examples, executing instructions may include running the instructions, converting the instructions, compiling the instructions, and/or interpreting the instructions, among other examples.

In some aspects, a UE (e.g., UE 120) may include means for detecting an occurrence of a triggering event associated with power headroom reporting, and/or means for transmitting, from the UE to a base station, a PHR MAC-CE based at least in part on the occurrence of the triggering event, wherein the PHR MAC-CE is for one or more uplink component carriers of the UE that are associated with one or more CORESET pool index values. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Uplink power control may determine a power for physical uplink shared channel (PUSCH), physical uplink control channel (PUCCH), sounding reference signal (SRS), and/or physical random access channel (PRACH) transmissions.

A UE may transmit a PUSCH on an active uplink bandwidth part (BWP) b of carrier f of serving cell c using a parameter set configuration with index j and a PUSCH power control adjustment state with index l. The UE may determine a PUSCH transmission power $P_{PUSCH,b,f,c}(i,j,q_d,l)$ in a PUSCH transmission occasion i as:

$$P_{PUSCH,b,f,c}(i, j, q_d, l) = \min\left\{ \begin{array}{l} P_{CMAX,f,c}(i), \\ P_{O\_PUSCH,b,f,c}(j) + 10 \log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array} \right\}.$$

With respect to the PUSCH transmission power $P_{PUSCH,b,f,c}(i,j,q_d,l)$ (in dB), $P_{O\_PUSCH,b,f,c}(j)$ may represent a P0 value for controlling a received power level, $a_{b,f,c}(j)$ may represent an alpha value for partial pathloss (PL) compensation, $PL_{b,f,c}(q_d)$ may represent a pathloss value based at least in part on a measured downlink reference signal with index $a_d$, $\Delta_{TF,b,f,c}(i)$ may depend on a resource allocation and a modulation and coding scheme (MCS) of the PUSCH, and $f_{b,f,c}(i,l)$ may represent a close loop power control based at least in part on transmit power control (TPC) commands with a closed loop index l.

For a PUSCH transmission, a set of uplink power control parameters may be configured. The uplink power control parameters may include a twoPUSCH-PC-AdjustmentStates parameter, which may be configured when there are two separate loops for closed loop power, and TPC commands may be applied separately for the two separate loops. The uplink power control parameters may include a set of P0 and alpha values for open-loop power control (p0-AlphaSets), where each member in the set may have an ID (p0-PUSCH-AlphaSetId:0, 1, . . . , 29). The uplink power control parameters may include a list of pathloss reference signals, where each member of the list may have an ID (pusch-PathlossReferenceRS-Id: 0, 1, . . . , 3). The uplink power control parameters may include a list of SRI-PUSCH mappings, where "SRI" refers to an SRS reference indicator, and each member of the list may have an ID (sri-PUSCH-PowerControlId: 0, . . . , 15). In addition, each member of the list may be configured based at least in part on an sri-PUSCH-PowerControlId parameter, which may be used as a codepoint of an SRI field in downlink control information (DCI). When a value of the SRI field in an uplink DCI scheduling PUSCH is x, then uplink power control (ULPC) parameters (e.g., PL RS, P0 and alpha, closed loop index) corresponding to an sri-PUSCH-PowerControlId equal to x may be used for the PUSCH transmission. The SRI field may be up to four bits and may indicate up to 16 values of x, depending on a configuration of the SRI field.

A power headroom may indicate an amount of remaining transmission power available to a UE in addition to power being used by a current transmission. The power headroom may be based at least in part on a difference between a UE maximum transmission power and a PUSCH transmission power. A power headroom report (PHR) may be a Type 1 report for a PUSCH, a Type 3 report for an SRS, and/or a Type 2 report for a PUCCH. For example, types of UE PHRs may include a Type 1 UE power headroom that is valid for a PUSCH transmission occasion i on an active UL BWP b of carrier f of serving cell c, or a Type 3 UE power headroom that is valid for an SRS transmission occasion i on an active UL BWP b of carrier f of serving cell c. Thus, a PHR may be determined for a component carrier and/or serving cell.

A UE may determine whether a PHR for an activated serving cell is based at least in part on an actual transmission. The actual transmission may be determined based at least in part on higher layer signalling of configured grant and periodic/semi-persistent sounding reference signal transmissions, and/or DCI received by the UE. The UE may determine whether the PHR for the activated serving cell is based at least in part on a reference format. The reference format may be determined based at least in part on higher layer signalling of configured grant and periodic/semi-persistent sounding reference signal transmissions, and/or DCI received by the UE. The UE may determine whether the PHR for the activated serving cell is based at least in part on a reference format.

When a UE determines that a Type 1 PHR for an activated serving cell is based at least in part on an actual PUSCH transmission, for a PUSCH transmission occasion i on an active uplink BWP b of carrier f of serving cell c, the UE may compute the Type 1 PHR as:

$$PH_{type1 b,f,c}(i,j,q_d,l) = P_{CMAX,f,c}(i) - \{P_{O\_PUSCH b,f,c}(j) + 10 \log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\}$$

With respect to the Type 1 PHR (in dB) based at least in part on an actual PUSCH transmission, $P_{CMAX,f,c}(i)$ may represent a UE configured maximum output power after backoff due to power management (e.g., backoff due to a maximum power reduction), and $P_{O\_PUSCH,b,f,c}(j)$, $M_{RB,b,f,c}^{PUSCH}(i)) + \alpha_{b,f,c}(j) \cdot PL_{b,f,c}(q_d) + \Delta_{TF,b,f,c}(i)$ (i) and $f_{b,f,c}(i,l)$ may be parameters used to determine a PUSCH transmit power.

When the UE determines that a Type 1 PHR for an activated serving cell is based at least in part on a reference PUSCH transmission, for a PUSCH transmission occasion i on an active UL BWP b of carrier f of serving cell c, the UE may compute the Type 1 PHR as:

$$PH_{type1,b,f,c}(i,j,q_d,l) = \tilde{P}_{CMAX,f,c}(i) - \{P_{O\_PUSCH,b,f,c}(j) + a_{b,f,c}(j) \cdot PL_{b,f,c}(q_d) + f_{b,f,c}(i,l)\} [dB]$$

With respect to the Type 1 PHR (in dB) based at least in part on a reference PUSCH transmission (e.g., a virtual power headroom report), $\tilde{P}_{CMAX,f,c}(i)$ may be computed assuming no backoff (e.g., maximum power reduction (MPR) values may be assumed to be 0 dB), and $P_{O\_PUSCH,b,f,c}(j)$, $\alpha_{b,f,c}(j)$, $PL_{b,f,c}(q_d)$, and $f_{b,f,c}(i,l)$ may be based at least in part on default or reference parameters of j,i,l, and $q_d$, where for P0 and alpha, p0-PUSCH-AlphaSetId is equal to 0, and for path loss, pusch-PathlossReferenceRS-Id is equal to 0, and for closedloopindex, l is equal to 0.

A PHR may be triggered by a MAC layer, and the PHR may be triggered by an occurrence of one or more triggering events. For example, the PHR may be triggered by a set of timers, such as a phr-PeriodicTimer or a phr-ProhibitTimer. The PHR may be triggered by a power change that satisfies a configurable threshold for a pathloss reference signal used for power control in an uplink component carrier. The PHR may be triggered by an activation of a secondary cell (SCell). The PHR may be triggered when an active BWP of a configured component carrier is changed from a dormant state to a non-dormant state.

A triggered PHR may be transmitted in a PHR MAC-CE on a first available PUSCH corresponding to an initial transmission of a transport block that can accommodate the PHR MAC-CE as a result of logical channel prioritization. The PUSCH may be dynamic (e.g., scheduled by DCI), or the PUSCH can be a configured-grant PUSCH.

A UE may be configured with multiple component carriers for a PUSCH transmission. The PHR MAC-CE may include a PHR for more than one component carrier when a multiplePHR parameter is enabled via radio resource control (RRC) signaling. Otherwise, the PHR may be a report for a primary cell (PCell) and a single-entry PHR MAC-CE format may be used. When a first PUSCH in a first component carrier carries the PHR MAC-CE, for a second component carrier, the PHR MAC-CE may include an actual PHR or a virtual PHR (based on a reference format). When a PUSCH transmission is performed on the second component carrier at a time of power headroom reporting (e.g., in a slot of the first PUSCH), and the PUSCH transmission on the second component carrier is scheduled by DCI that satisfies a timeline condition, the PHR MAC-CE may include the actual PHR. Otherwise, the MAC-CE may include the virtual PHR.

The PHR MAC-CE may be a single-entry PHR MAC-CE or a multiple-entry PHR MAC-CE. The single-entry PHR MAC-CE may include a power headroom (PH) field, which may indicate a PH level for the PCell, and a $P_{CMAX,f,c}$ field, which may indicate the $P_{CMAX,f,c}$ used for calculating the preceding PH field. The multiple-entry PHR MAC-CE may include entries for the PCell and a plurality of SCells. For example, for the PCell or a given SCell, the multiple-entry PHR MAC-CE may include the corresponding PH field, the $P_{CMAX,f,c}$ field, a "V" value which may indicate whether a PH value in the PH field corresponds to a real transmission or a reference format, and a "P" value which may indicate whether power backoff is applied due to power management.

Figure 3:
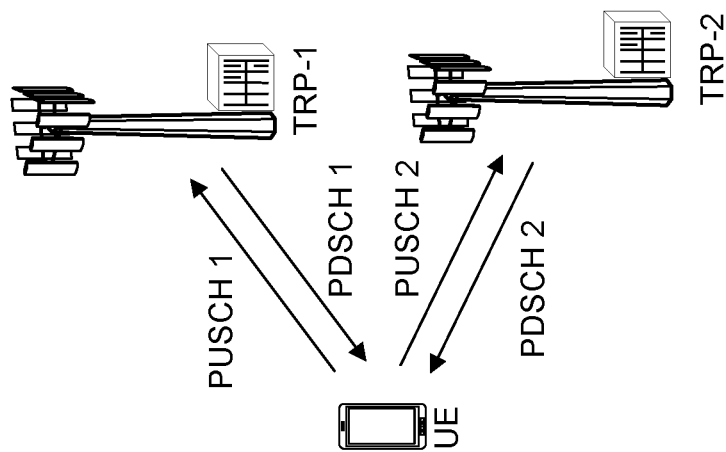
FIG. 3 is a diagram illustrating an example of a multi-transmit-receive point configuration, in accordance with the present disclosure.

FIG. 3 is a diagram illustrating an example 300 of a multi-transmit-receive point (mTRP) configuration, in accordance with the present disclosure.

As shown in FIG. 3, an mTRP transmission configuration may follow a multi-DCI based design. For example, a UE (e.g., UE 120a) may communicate with a first TRP (TRP-1) and a second TRP (TRP-2). The first TRP may transmit first DCI to the UE via a first PDCCH (PDCCH 1). The first DCI may schedule a first PUSCH (PUSCH 1) for the UE. The second TRP may transmit second DCI to the UE via a second PDCCH (PDCCH 2). The second DCI may schedule a second PUSCH (PUSCH 2) for the UE.

As indicated above, FIG. 3 is provided as an example. Other examples may differ from what is described with regard to FIG. 3.

Figure 4:
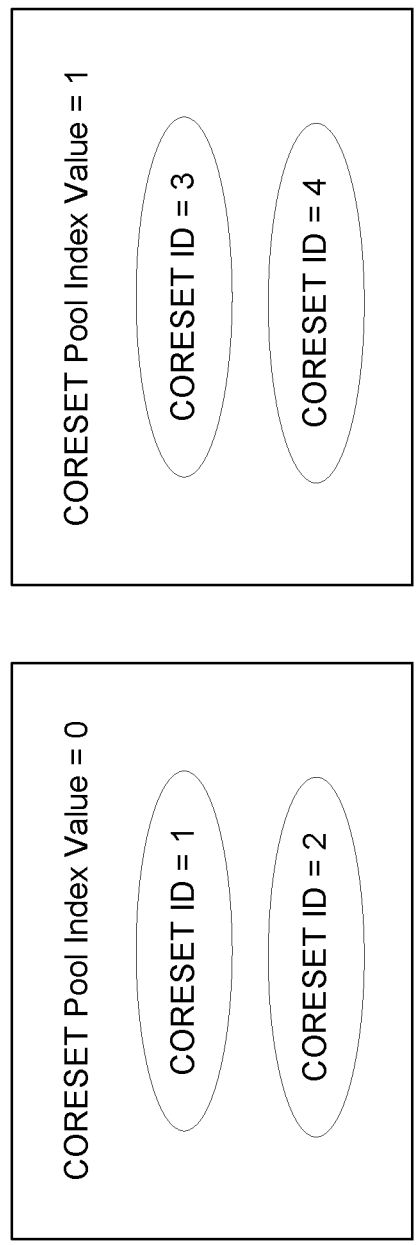
FIG. 4 is a diagram illustrating an example of CORESET pool index value configurations, in accordance with the present disclosure.

FIG. 4 is a diagram illustrating an example 400 of CORESET pool index value configurations, in accordance with the present disclosure.

A UE may differentiate between different TRPs based at least in part on a CORESET pool index value. A CORESET may be configured with a CORESET pool index value. "CORESET" may refer to a set of physical resources within a specific area in a downlink resource grid. The CORESET may be used to carry a PDCCH (e.g., DCI). "CORESET" may refer to a set of resource blocks and a set of OFDM symbols, which may be configurable with a corresponding PDCCH search space. A CORESET may provide configuration flexibilities of control regions including time, frequency, numerologies, and operating points to address a wide range of use cases. The CORESET pool index value may be 0 or 1, which may group the CORESETs into two separate groups. Other than separate CORESET pool index values, which may be associated with different TRPs, a notion of different TRPs may be transparent to the UE.

As shown in FIG. 4, a UE may be configured by a higher parameter PDCCH-Config, which may include two different CORESET pool index values in CORESETs for an active BWP of a serving cell. For example, the UE may be configured with a first CORESET pool index value (CORESETPoolIndex=0). The first CORESET pool index value may be associated with two separate CORESET IDs (e.g., CORESET ID=1 and CORESET ID=2). The UE may be configured with a second CORESET pool index value (CORESETPoolIndex=1). The second CORESET pool index value may be associated with two separate CORESET IDs (e.g., CORESET ID=3 and CORESET ID=4). The first CORESET pool index value may be associated with a first TRP and the second CORESET pool index value may be associated with a second TRP.

The CORESET pool index values may be configured per component carrier. For example, two component carriers may each be configured with two CORESET pool index values (both are mTRP). One component carrier may be configured with two CORESET pool index values (mTRP) while another component carrier may be configured with one CORESET pool index value (e.g., either 0 or 1, corresponding to a first TRP or a second TRP, respectively), or may not be configured with a CORESET pool index value (e.g., a value of 0 may be assumed, which may indicate the first TRP).

As indicated above, FIG. 4 is provided as an example. Other examples may differ from what is described with regard to FIG. 4.

A UE may not be configured to perform power headroom reporting for the case of uplink carrier aggregation, in which multiple uplink component carriers may be configured for the UE, and specific uplink component carriers may be configured with specific CORESET pool index values. The multiple uplink component carriers may be configured for mTRP and/or single TRP (sTRP) transmissions. The UE may be unable to perform power headroom reporting on a per uplink component carrier basis and/or on a per CORESET pool index value basis. As a result, a base station that receives the power headroom reporting from the UE may be unaware of certain PHR information for the UE.

In various aspects of techniques and apparatuses described herein, a UE may be configured to perform power headroom reporting for multiple uplink component carriers in an uplink carrier aggregation scenario (e.g., when the UE is configured with multiple uplink component carriers for uplink carrier aggregation). In some aspects, the UE may be configured to perform the power headroom reporting with respect to one or more CORESET pool index values that are associated with the uplink component carriers. For example, the UE may be configured to perform power headroom reporting for certain CORESET pool index values (irrespective of the uplink component carriers associated with the CORESET pool index value). In some aspects, the UE may be configured to perform power headroom reporting on a per uplink component carrier basis, where a PHR may be transmitted for a certain CORESET pool index value associated with a defined uplink component carrier. In some aspects, the UE may be configured to perform power headroom reporting for each CORESET pool index value on a per uplink component carrier basis. As a result, the UE may be able to transmit PHRs to the base station, when the UE is configured to use multiple uplink component carriers in the uplink carrier aggregation scenario.

Figure 5:
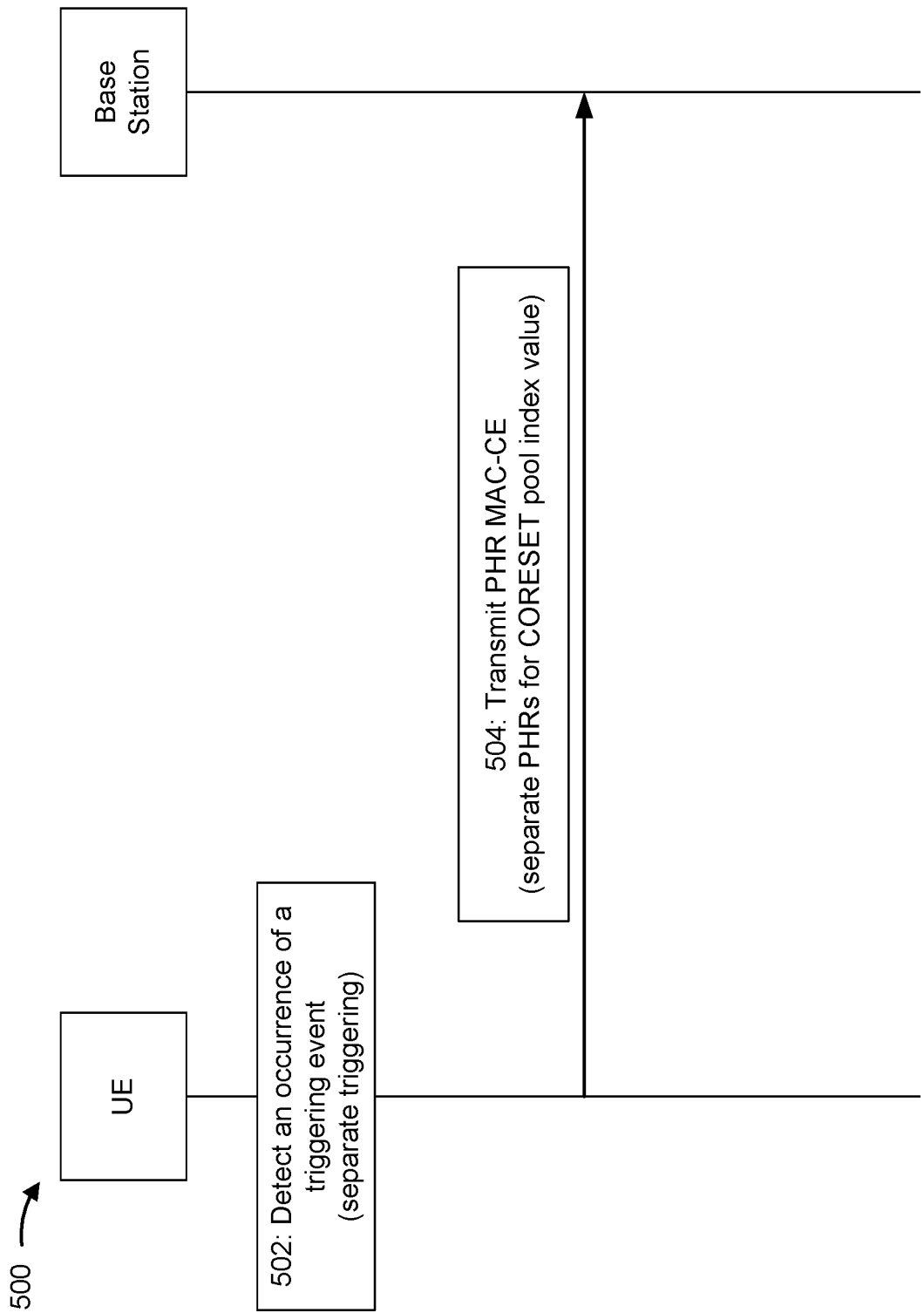
FIGS. 5-7 are diagrams illustrating examples associated with power headroom reporting for uplink component carriers, in accordance with the present disclosure.

FIG. 5 is a diagram illustrating an example 500 associated with power headroom reporting for uplink component carriers, in accordance with the present disclosure. As shown in FIG. 5, example 500 includes communication between a UE (e.g., UE 120) and a base station (e.g., base station 110). In some aspects, the UE and the base station may be included in a wireless network such as wireless network 100. The UE and the base station may communicate on a wireless access link, which may include an uplink and a downlink.

As shown by reference number 502, the UE may detect an occurrence of a triggering event associated with power headroom reporting. The power headroom reporting may be triggered separately for separate TRPs. The UE may detect the occurrence of the triggering event based at least in part on detecting an expiry of a periodic timer (phr-PeriodicTimer) or a prohibit timer (phr-ProhibitTimer). The prohibit timer may be maintained per TRP and/or CORESET pool index value. The prohibit timer, when running, may not affect a triggering event for power headroom reporting on another TRP and/or CORESET pool index value. The UE may detect the occurrence of the triggering event based at least in part on detecting a power change that satisfies a defined threshold for a pathloss reference signal used for power control for one or more uplink component carriers. The UE may detect the occurrence of the triggering event based at least in part on detecting an activation of one or more uplink component carriers. The UE may detect the occurrence of the triggering event based at least in part on detecting that an active BWP of a configured uplink component carrier is changed from a dormant state to a non-dormant state.

As shown by reference number 504, the UE may transmit, to the base station, a PHR MAC-CE based at least in part on the occurrence of the triggering event. The PHR MAC-CE may be for one or more uplink component carriers of the UE that are associated with one or more CORESET pool index values.

In some aspects, the UE may transmit the PHR MAC-CE for uplink component carriers that are configured with a same CORESET pool index value. For example, the UE may be configured with multiple uplink component carriers, and the CORESET pool index value may be common to the multiple uplink component carriers. The PHR MAC-CE may be for an actual PHR corresponding to an actual PUSCH transmission, or the PHR MAC-CE may be for a virtual PHR corresponding to a reference PUSCH transmission.

In some aspects, a size of the PHR MAC-CE that corresponds to a CORESET pool index value (e.g., 0 or 1) may depend on a number of uplink component carriers that are configured with that CORESET pool index value.

For example, the UE may be configured with five uplink component carriers. The first and second uplink component carriers may be configured with both of the CORESET pool index values, the third and fourth uplink component carriers may be configured with a CORESET pool index value of 0, and the fifth uplink component carrier may be configured with a CORESET pool index value of 1. A PHR MAC-CE that corresponds to the CORESET pool index value of 0 may include a bitmap with four bits for up to four fields for the corresponding uplink component carriers. A PHR MAC-CE that corresponds to the CORESET pool index value of 1 may include a bitmap with three bits for up to three fields for the corresponding uplink component carriers.

In some aspects, the PHR MAC-CE may include a field that indicates the CORESET pool index value associated with the PHR. In other words, a whole PHR MAC-CE may be associated with either a first CORESET pool index value or a second CORESET pool index value. The PHR MAC-CE may be reported on a PUSCH associated with a different CORESET pool index value (e.g., a cross TRP report). Alternatively, the PHR MAC-CE may be reported on a PUSCH that is associated with a CORESET pool index value to which the PHR MAC-CE corresponds (e.g., a no cross-TRP report).

In some aspects, in the PHR MAC-CE, a PHR for some uplink component carriers may correspond to a CORESET pool index value of 0, while a PHR for other uplink component carriers may correspond to a CORESET pool index value of 1.

In some aspects, the PHR MAC-CE may be determined per CORESET pool index value for one or more CORESET pool index values. For example, the PHR MAC-CE may be associated with a first CORESET pool index value or a second CORESET pool index value. Additionally, a triggering of the PHR MAC-CE and a reporting of the PHR MAC-CE may be separately determined at the UE. For example, the PHR MAC-CE may be triggered separately for separate CORESET pool index values.

As indicated above, FIG. 5 is provided as an example. Other examples may differ from what is described with regard to FIG. 5.

Figure 6:
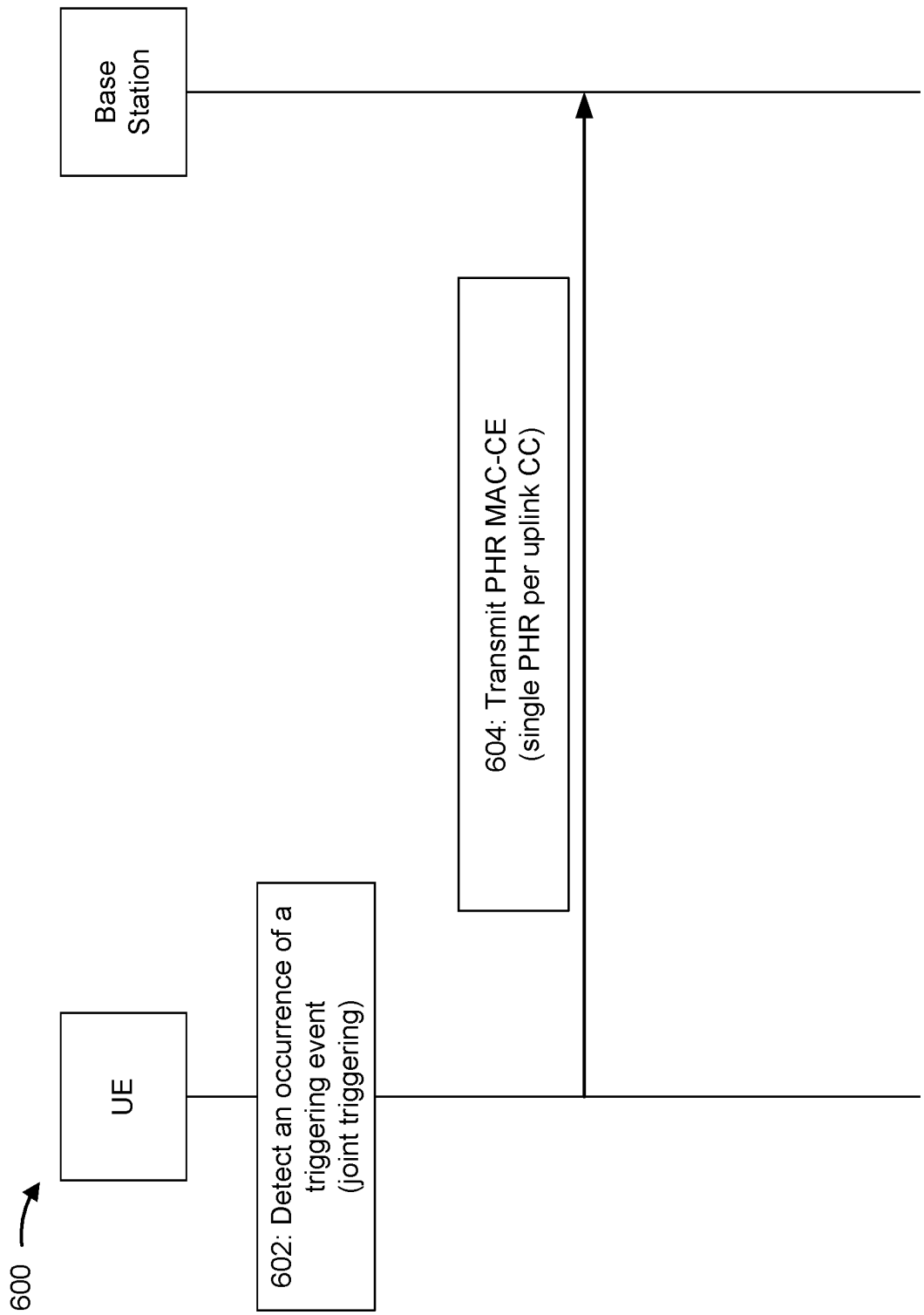

FIG. 6 is a diagram illustrating an example 600 associated with power headroom reporting for uplink component carriers, in accordance with the present disclosure. As shown in FIG. 6, example 600 includes communication between a UE (e.g., UE 120) and a base station (e.g., base station 110). In some aspects, the UE and the base station may be included in a wireless network such as wireless network 100. The UE and the base station may communicate on a wireless access link, which may include an uplink and a downlink.

As shown by reference number 602, the UE may detect an occurrence of a triggering event associated with power headroom reporting. The power headroom reporting may be triggered jointly for separate TRPs. The UE may detect the occurrence of the triggering event based at least in part on a timer, a power change for a pathloss reference signal, an activation of an uplink component carrier, and/or an active BWP that is changed from a dormant state to a non-dormant state.

As shown by reference number 604, the UE may transmit, to the base station, a PHR MAC-CE based at least in part on the occurrence of the triggering event. The PHR MAC-CE may be for one or more uplink component carriers of the UE that are associated with one or more CORESET pool index values. More specifically, the transmitted PHR MAC-CE may include one PHR per uplink component carrier.

In some aspects, the PHR MAC-CE may be transmitted on a first uplink shared channel (e.g., a first PUSCH) in a first uplink component carrier. A first PHR field associated with the first uplink carrier may be an actual PHR field. A presence of a second uplink shared channel (e.g., a second PUSCH) in a second uplink component carrier in a same slot as the first uplink shared channel that satisfies a timeline condition (when scheduled by a DCI) may indicate that a second PHR field of the PHR MAC-CE corresponding to the second uplink component carrier is an actual PHR field. Alternatively, a lack of the second uplink shared channel in the second uplink component carrier in the same slot as the first uplink shared channel may indicate that the second PHR field of the PHR MAC-CE corresponding to the second uplink component carrier is a virtual PHR field. In addition, if the second uplink shared channel in the second uplink component carrier is scheduled by a DCI that does not satisfy a timeline condition, a second PHR field of the PHR MAC-CE corresponding to the second uplink component carrier may be a virtual PHR field, even when the second uplink shared channel in the second uplink component carrier is in a same slot as the first uplink shared channel. The virtual PHR field may be associated with a first CORESET pool index value that is based on a set of reference parameters associated with the first CORESET pool index value. Alternatively, the virtual PHR field may be associated with a same CORESET pool index value that is associated with the first uplink shared channel using a corresponding set of reference parameters.

In some aspects, the PHR MAC-CE may be transmitted on a first uplink shared channel in a first uplink component carrier, and a first PHR field associated with the first uplink carrier may be an actual PHR field. A CORESET pool index value of a second PHR field of the PHR MAC-CE may correspond to a CORESET pool index value of the first uplink shared channel. The second PHR field may be an actual PHR field based at least in part on a presence of a second uplink shared channel in a second uplink component carrier in a same slot as the first uplink shared channel that is associated with the CORESET pool index value, and when a timeline condition scheduled by a DCI is satisfied. Alternatively, the second PHR field may be a virtual PHR field based at least in part on a lack of the second uplink shared channel in the second uplink component carrier in the same slot as the first uplink shared channel that is associated with the CORESET pool index value. In addition, if the second uplink shared channel in the second uplink component carrier is scheduled by a DCI that does not satisfy a timeline condition, a second PHR field of the PHR MAC-CE corresponding to the second uplink component carrier may be a virtual PHR field, even when the second uplink shared channel in the second uplink component carrier is in a same slot as the first uplink shared channel.

In some aspects, the PHR MAC-CE may indicate a first CORESET pool index value for a first uplink component carrier or a second CORESET pool index value for a second uplink component carrier. In other words, the PHR MAC-CE may indicate a CORESET pool index value (e.g., 0 or 1) that the PHR for a given uplink component carrier is associated with in a field of the PHR MAC-CE corresponding to the given uplink component carrier.

In some aspects, a CORESET pool index value for each PHR field of the PHR MAC-CE may be different. For example, for a PHR field corresponding to a first uplink component carrier, the PHR may be for a CORESET pool index value of 0. For another PHR field corresponding to a second uplink component carrier, the PHR may be for a CORESET pool index of 1.

In some aspects, the PHR MAC-CE may be determined for the CORESET pool index values, and a CORESET pool index value associated with a PHR field in the MAC-CE may be determined per uplink component carrier. A different CORESET pool index value may be associated with each PHR field in the MAC-CE. A first PHR field corresponding to a first uplink component carrier may be for a first CORESET pool index value. A second PHR field corresponding to a second uplink component carrier may be for a second CORESET pool index value. Additionally, a triggering of the PHR MAC-CE and a reporting of the PHR MAC-CE may be jointly determined at the UE. For example, the PHR MAC-CE may be triggered jointly across multiple CORESET pool index values.

In some aspects, the UE may not perform simultaneous PUSCH transmissions in a same uplink component carrier. In other words, the UE may perform time division multiplexing of PUSCHs in the same uplink component carrier.

As indicated above, FIG. 6 is provided as an example. Other examples may differ from what is described with regard to FIG. 6.

Figure 7:
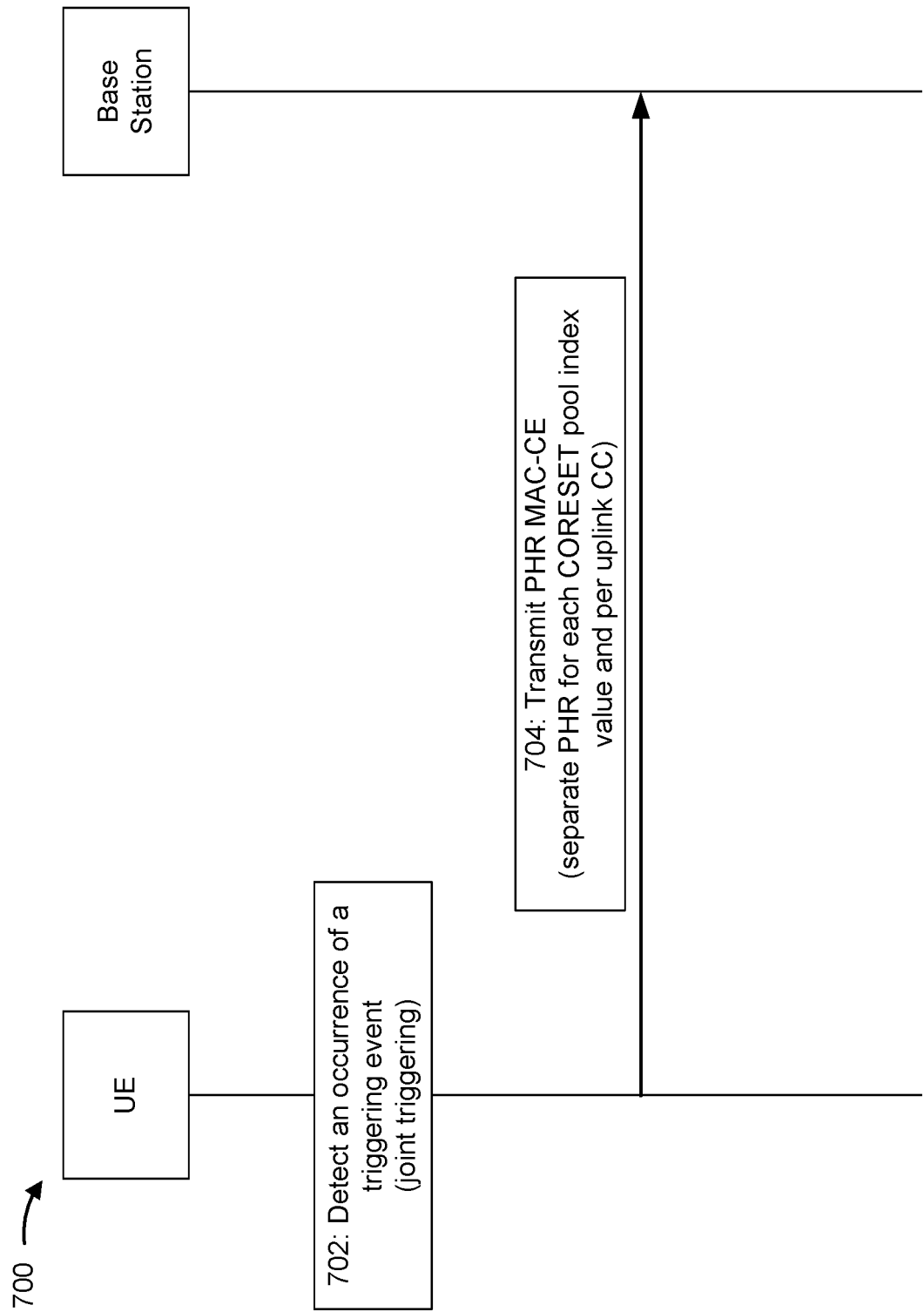

FIG. 7 is a diagram illustrating an example 700 associated with power headroom reporting for uplink component carriers, in accordance with the present disclosure. As shown in FIG. 7, example 700 includes communication between a UE (e.g., UE 120) and a base station (e.g., base station 110). In some aspects, the UE and the base station may be included in a wireless network such as wireless network 100. The UE and the base station may communicate on a wireless access link, which may include an uplink and a downlink.

As shown by reference number 702, the UE may detect an occurrence of a triggering event associated with power headroom reporting. The power headroom reporting may be triggered jointly for separate TRPs. The UE may detect the occurrence of the triggering event based at least in part on a timer, a power change for a pathloss reference signal, an activation of an uplink component carrier, and/or an active BWP that is changed from a dormant state to a non-dormant state.

As shown by reference number 704, the UE may transmit, to the base station, a PHR MAC-CE based at least in part on the occurrence of the triggering event. The PHR MAC-CE may be for one or more uplink component carriers of the UE that are associated with one or more CORESET pool index values. More specifically, the UE may transmit the PHR MAC-CE to include separate PHRs for each CORESET pool index value and per uplink component carrier. The PHRs, whether actual or virtual, may be determined separately for each CORESET pool index value per uplink component carrier.

In some aspects, a maximum size of the PHR MAC-CE may be based at least in part on a number of uplink component carriers that are configured with two CORESET pool index values (e.g., 0 and 1).

In some aspects, the UE may transmit, in the PHR MAC-CE, a bitmap indicating that a PHR is associated with one or more uplink component carriers or one or more CORESET pool index values. For example, the bitmap may include one bit to indicate whether the PHR is transmitted for a single uplink component carrier. In this case, for one bit, two PHR values may be reported for two CORESET pool index values. Alternatively, the bitmap may include two bits to indicate whether the PHR is transmitted separately for each CORESET pool index value.

In some aspects, the PHR MAC-CE may be determined for two CORESET pool index values, and the PHR MAC-CE may include two PHR fields for an uplink component carrier that is associated with the two CORESET pool index values. Additionally, a triggering of the PHR MAC-CE and a reporting of the PHR MAC-CE may be jointly determined at the UE. For example, the PHR MAC-CE may be triggered jointly across multiple CORESET pool index values.

In some aspects, the UE may perform simultaneous PUSCH transmissions in a same uplink component carrier. In other words, the UE may perform frequency division multiplexing or spatial division multiplexing of PUSCHs in the same uplink component carrier.

As indicated above, FIG. 7 is provided as an example. Other examples may differ from what is described with regard to FIG. 7.

Figure 8:
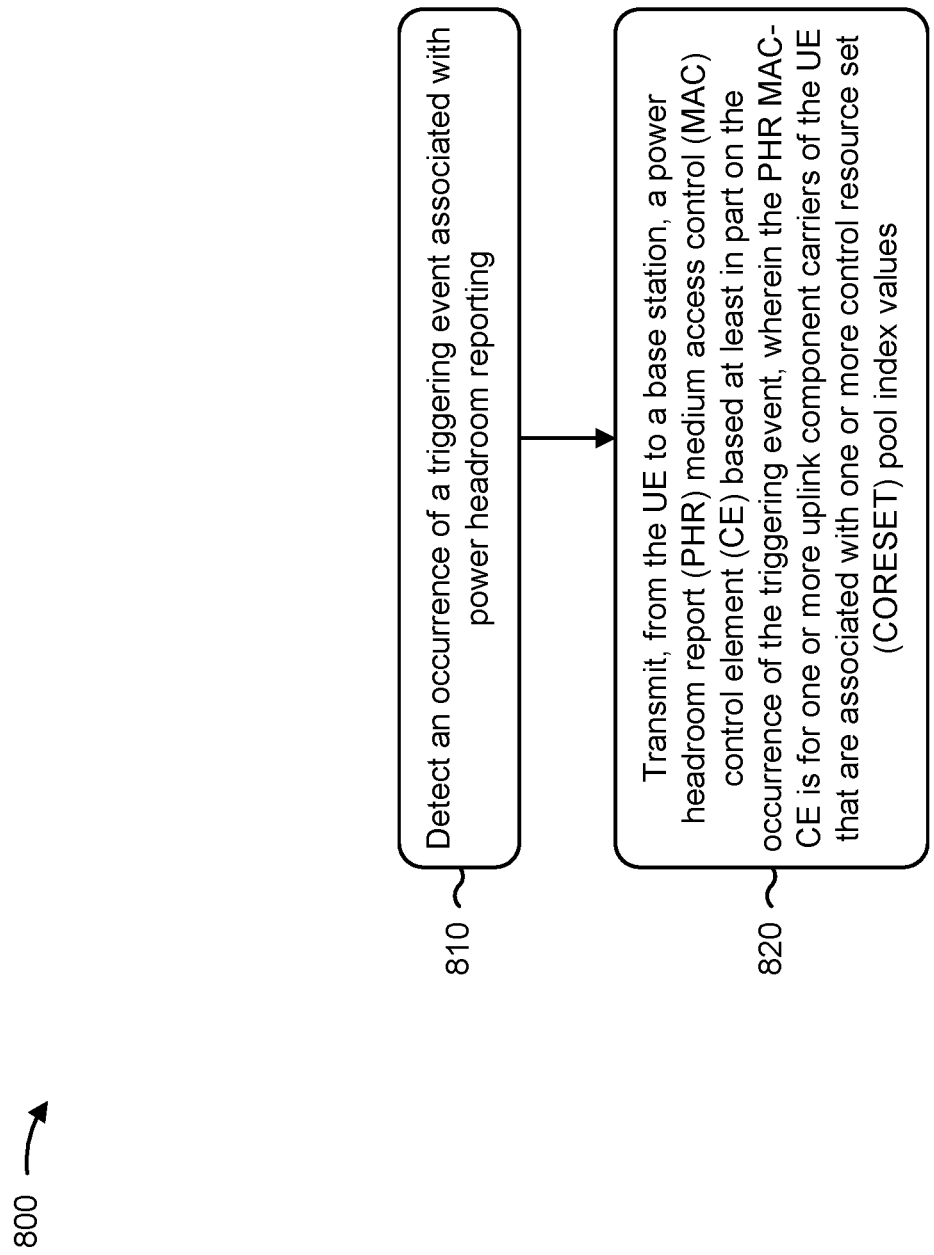
FIG. 8 is a diagram illustrating an example process associated with power headroom reporting for uplink component carriers, in accordance with the present disclosure.

FIG. 8 is a diagram illustrating an example process 800 performed, for example, by a UE, in accordance with the present disclosure. Example process 800 is an example where the UE (e.g., UE 120) performs operations associated with power headroom reporting for uplink component carriers.

As shown in FIG. 8, in some aspects, process 800 may include detecting an occurrence of a triggering event associated with power headroom reporting (block 810). For example, the UE (e.g., using antenna 252, demodulator 254, MIMO detector 256, receive processor 258, transmit processor 264, TX MIMO processor 266, modulator 254, controller/processor 280, and/or memory 282) may detect an occurrence of a triggering event associated with power headroom reporting, as described above in connection with FIGS. 5-7.

As further shown in FIG. 8, in some aspects, process 800 may include transmitting, from the UE to a base station, a PHR MAC-CE based at least in part on the occurrence of the triggering event, wherein the PHR MAC-CE is for one or more uplink component carriers of the UE that are associated with one or more CORESET pool index values (block 820). For example, the UE (e.g., using antenna 252, transmit processor 264, TX MIMO processor 266, modulator 254, controller/processor 280, and/or memory 282) may transmit, from the UE to a base station, a PHR MAC-CE based at least in part on the occurrence of the triggering event, wherein the PHR MAC-CE is for one or more uplink component carriers of the UE that are associated with one or more CORESET pool index values, as described above in connection with FIGS. 5-7.

Process 800 may include additional aspects, such as any single aspect or any combination of aspects described below and/or in connection with one or more other processes described elsewhere herein.

In a first aspect, a single CORESET pool index value is common to multiple uplink component carriers of the UE.

In a second aspect, alone or in combination with the first aspect, a size of the PHR MAC-CE that corresponds to a CORESET pool index value is based at least in part on a number of uplink component carriers that are configured with the CORESET pool index value.

In a third aspect, alone or in combination with one or more of the first and second aspects, the PHR MAC-CE indicates an associated CORESET pool index value.

In a fourth aspect, alone or in combination with one or more of the first through third aspects, transmitting the PHR MAC-CE comprises transmitting the PHR MAC-CE on an uplink shared channel associated with a CORESET pool index value of the PHR MAC-CE.

In a fifth aspect, alone or in combination with one or more of the first through fourth aspects, transmitting the PHR MAC-CE comprises transmitting the PHR MAC-CE on an uplink shared channel that is not associated with a CORESET pool index value of the PHR MAC-CE.

In a sixth aspect, alone or in combination with one or more of the first through fifth aspects, process 800 includes performing uplink transmissions based at least in part on time division multiplexing of uplink shared channels in the one or more uplink component carriers.

In a seventh aspect, alone or in combination with one or more of the first through sixth aspects, the PHR MAC-CE is transmitted on a first uplink shared channel in a first uplink component carrier, and a first PHR field associated with the first uplink carrier is an actual PHR field. A presence of a second uplink shared channel in a second uplink component carrier in a same slot as the first uplink shared channel indicates that a second PHR field of the PHR MAC-CE corresponding to the second uplink component carrier is an actual PHR field. A lack of the second uplink shared channel in the second uplink component carrier in the same slot as the first uplink shared channel indicates that the second PHR field of the PHR MAC-CE corresponding to the second uplink component carrier is a virtual PHR field. The virtual PHR field is associated with a first CORESET pool index value that is based on a set of reference parameters associated with the first CORESET pool index value, or the virtual PHR field is associated with a same CORESET pool index value that is associated with the first uplink shared channel.

In an eighth aspect, alone or in combination with one or more of the first through seventh aspects, the process 800 includes determining whether a PHR field in the PHR MAC-CE is associated with an actual PHR or a virtual PHR, and determining the one or more CORESET pool index values to be associated with the PHR field in the PHR MAC-CE based at least in part on whether the PHR field in the PHR MAC-CE is associated with the actual PHR or the virtual PHR.

In a ninth aspect, alone or in combination with one or more of the first through seventh aspects, the process 800 includes determining the one or more CORESET pool index values to be associated with a PHR field in the PHR MAC-CE, and determining whether the PHR field in the PHR MAC-CE is associated with an actual PHR or a virtual PHR based at least in part on the one or more CORESET pool index values to be associated with the PHR field in the PHR MAC-CE.

In a tenth aspect, alone or in combination with one or more of the first through seventh aspects, the PHR MAC-CE is transmitted on a first uplink shared channel in a first uplink component carrier, and a first PHR field associated with the first uplink carrier is an actual PHR field. A CORESET pool index value of a second PHR field of the PHR MAC-CE corresponds to a CORESET pool index value of the first uplink shared channel, and the second PHR field is an actual PHR field based at least in part on a presence of a second uplink shared channel in a second uplink component carrier in a same slot as the first uplink shared channel that is associated with the CORESET pool index value. The second PHR field is a virtual PHR field based at least in part on a lack of the second uplink shared channel in the second uplink component carrier in the same slot as the first uplink shared channel that is associated with the CORESET pool index value.

In an eleventh aspect, alone or in combination with one or more of the first through eighth aspects, the PHR MAC-CE indicates a first CORESET pool index value for a first uplink component carrier or a second CORESET pool index value for a second uplink component carrier.

In a twelfth aspect, alone or in combination with one or more of the first through ninth aspects, process 800 includes performing uplink transmissions based at least in part on frequency division multiplexing or spatial division multiplexing of uplink shared channels in the one or more uplink component carriers.

In a thirteenth aspect, alone or in combination with one or more of the first through tenth aspects, a maximum size of the PHR MAC-CE is based at least in part on a number of uplink component carriers that are configured with two CORESET pool index values.

In a fourteenth aspect, alone or in combination with one or more of the first through eleventh aspects, transmitting the PHR MAC-CE comprises transmitting a bitmap indicating that a PHR is associated with the one or more uplink component carriers or the one or more CORESET pool index values, and the bitmap includes one bit to indicate whether the PHR is transmitted for a single uplink component carrier, or the bitmap includes two bits to indicate whether the PHR is transmitted separately for each CORESET pool index value of the one or more CORESET pool index values.

In a fifteenth aspect, alone or in combination with one or more of the first through twelfth aspects, transmitting the PHR MAC-CE is triggered separately for separate CORESET pool index values, or transmitting the PHR MAC-CE is triggered jointly across multiple CORESET pool index values.

In a sixteenth aspect, alone or in combination with one or more of the first through thirteenth aspects, the PHR MAC-CE is determined per CORESET pool index value for the one or more CORESET pool index values, and the PHR MAC-CE is associated with a first CORESET pool index value or a second CORESET pool index value, and a triggering of the PHR MAC-CE and a reporting of the PHR MAC-CE is separately determined at the UE.

In a seventeenth aspect, alone or in combination with one or more of the first through fourteenth aspects, the PHR MAC-CE is determined for the one or more CORESET pool index values, and a CORESET pool index value associated with a PHR field in the MAC-CE is determined per uplink component carrier in the one or more uplink component carriers. A different CORESET pool index value is associated with each PHR field in the MAC-CE, and a first PHR field corresponding to a first uplink component carrier is for a first CORESET pool index value. A second PHR field corresponding to a second uplink component carrier is for a second CORESET pool index value. A triggering of the PHR MAC-CE and a reporting of the PHR MAC-CE is jointly determined at the UE.

In an eighteenth aspect, alone or in combination with one or more of the first through fifteenth aspects, the PHR MAC-CE is determined for the one or more CORESET pool index values, the PHR MAC-CE includes two PHR fields for an uplink component carrier that is associated with two CORESET pool index values, and a triggering of the PHR MAC-CE and a reporting of the PHR MAC-CE is jointly determined at the UE.

In a nineteenth aspect, alone or in combination with one or more of the first through sixteenth aspects, the one or more CORESET pool index values include one or more of a first value or a second value, and the first value corresponds to a first transmit-receive point and the second value corresponds to a second transmit-receive point.

In a twentieth aspect, alone or in combination with one or more of the first through seventeenth aspects, detecting the occurrence of the triggering event comprises detecting an expiry of a periodic timer or a prohibit timer, detecting a power change that satisfies a defined threshold for a pathloss reference signal used for power control for the one or more uplink component carriers, detecting an activation of the one or more uplink component carriers, or detecting that an active bandwidth part of a configured uplink component carrier is changed from a dormant state to a non-dormant state.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
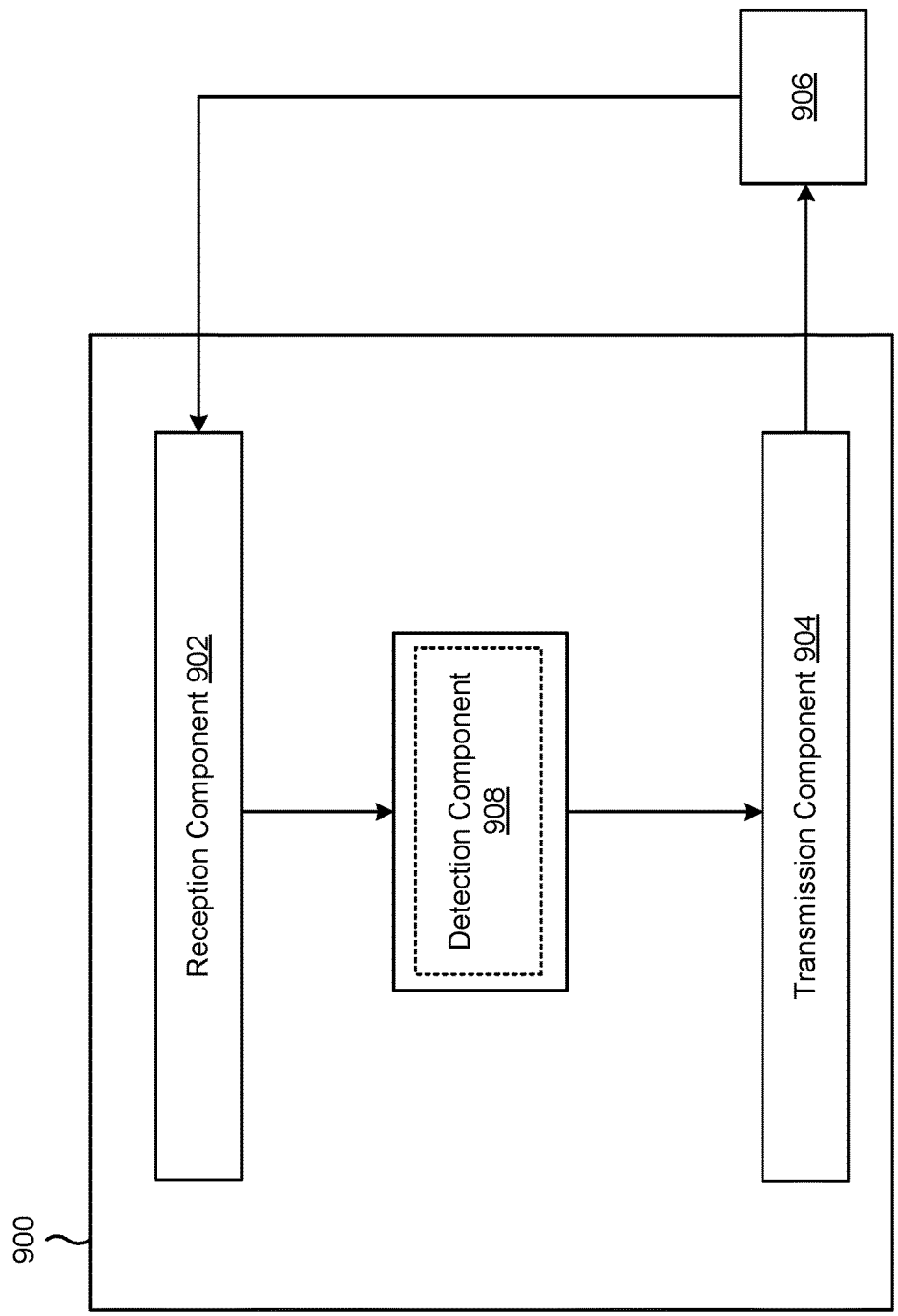
FIG. 9 is a block diagram of an example apparatus for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a detection component 908, among other examples.

In some aspects, the apparatus 900 may be configured to perform one or more operations described herein in connection with FIGS. 5-7. Additionally or alternatively, the apparatus 900 may be configured to perform one or more processes described herein, such as process 800 of FIG. 8. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

The detection component 908 may detect an occurrence of a triggering event associated with power headroom reporting. In some aspects, the detection component 908 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 904 may transmit, from the UE to a base station, a PHR MAC-CE based at least in part on the occurrence of the triggering event, wherein the PHR MAC-CE is for one or more uplink component carriers of the UE that are associated with one or more CORESET pool index values.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: detecting an occurrence of a triggering event associated with power headroom reporting; and transmitting, from the UE to a base station, a power headroom report (PHR) medium access control (MAC) control element (CE) based at least in part on the occurrence of the triggering event, wherein the PHR MAC-CE is for one or more uplink component carriers of the UE that are associated with one or more control resource set (CORESET) pool index values.

Aspect 2: The method of Aspect 1, wherein a single CORESET pool index value is common to multiple uplink component carriers of the UE.

Aspect 3: The method of any of Aspects 1 through 2, wherein a size of the PHR MAC-CE that corresponds to a CORESET pool index value is based at least in part on a number of uplink component carriers that are configured with the CORESET pool index value.

Aspect 4: The method of any of Aspects 1 through 3, wherein the PHR MAC-CE indicates an associated CORESET pool index value.

Aspect 5: The method of any of Aspects 1 through 4, wherein transmitting the PHR MAC-CE comprises: transmitting the PHR MAC-CE on an uplink shared channel associated with a CORESET pool index value of the PHR MAC-CE.

Aspect 6: The method of any of Aspects 1 through 5, wherein transmitting the PHR MAC-CE comprises: transmitting the PHR MAC-CE on an uplink shared channel that is not associated with a CORESET pool index value of the PHR MAC-CE.

Aspect 7: The method of any of Aspects 1 through 6, further comprising: performing uplink transmissions based at least in part on time division multiplexing of uplink shared channels in the one or more uplink component carriers.

Aspect 8: The method of any of Aspects 1 through 7, further comprising: determining whether a PHR field in the PHR MAC-CE is associated with an actual PHR or a virtual PHR; and determining the one or more CORESET pool index values to be associated with the PHR field in the PHR MAC-CE based at least in part on whether the PHR field in the PHR MAC-CE is associated with the actual PHR or the virtual PHR.

Aspect 9: The method of any of Aspects 1 through 8, further comprising: determining the one or more CORESET pool index values to be associated with a PHR field in the PHR MAC-CE; and determining whether the PHR field in the PHR MAC-CE is associated with an actual PHR or a virtual PHR based at least in part on the one or more CORESET pool index values to be associated with the PHR field in the PHR MAC-CE.

Aspect 10: The method of any of Aspects 1 through 9, wherein: the PHR MAC-CE is transmitted on a first uplink shared channel in a first uplink component carrier, and a first PHR field associated with the first uplink carrier is an actual PHR field, and wherein a presence of a second uplink shared channel in a second uplink component carrier in a same slot as the first uplink shared channel indicates that a second PHR field of the PHR MAC-CE corresponding to the second uplink component carrier is an actual PHR field, and wherein a lack of the second uplink shared channel in the second uplink component carrier in the same slot as the first uplink shared channel indicates that the second PHR field of the PHR MAC-CE corresponding to the second uplink component carrier is a virtual PHR field, wherein the virtual PHR field is associated with a first CORESET pool index value that is based on a set of reference parameters associated with the first CORESET pool index value, or the virtual PHR field is associated with a same CORESET pool index value that is associated with the first uplink shared channel.

Aspect 11: The method of any of Aspects 1 through 10, wherein: the PHR MAC-CE is transmitted on a first uplink shared channel in a first uplink component carrier, and a first PHR field associated with the first uplink carrier is an actual PHR field, and wherein a CORESET pool index value of a second PHR field of the PHR MAC-CE corresponds to a CORESET pool index value of the first uplink shared channel, wherein the second PHR field is an actual PHR field based at least in part on a presence of a second uplink shared channel in a second uplink component carrier in a same slot as the first uplink shared channel that is associated with the CORESET pool index value, or wherein the second PHR field is a virtual PHR field based at least in part on a lack of the second uplink shared channel in the second uplink component carrier in the same slot as the first uplink shared channel that is associated with the CORESET pool index value.

Aspect 12: The method of any of Aspects 1 through 11, wherein the PHR MAC-CE indicates a first CORESET pool index value for a first uplink component carrier or a second CORESET pool index value for a second uplink component carrier.

Aspect 13: The method of any of Aspects 1 through 12, further comprising: performing uplink transmissions based at least in part on frequency division multiplexing or spatial division multiplexing of uplink shared channels in the one or more uplink component carriers.

Aspect 14: The method of any of Aspects 1 through 13, wherein a maximum size of the PHR MAC-CE is based at least in part on a number of uplink component carriers that are configured with two CORESET pool index values.

Aspect 15: The method of any of Aspects 1 through 14, wherein transmitting the PHR MAC-CE comprises: transmitting a bitmap indicating that a PHR is associated with the one or more uplink component carriers or the one or more CORESET pool index values, wherein the bitmap includes one bit to indicate whether the PHR is transmitted for a single uplink component carrier, or wherein the bitmap includes two bits to indicate whether the PHR is transmitted separately for each CORESET pool index value of the one or more CORESET pool index values.

Aspect 16: The method of any of Aspects 1 through 15, wherein transmitting the PHR MAC-CE is triggered separately for separate CORESET pool index values; or transmitting the PHR MAC-CE is triggered jointly across multiple CORESET pool index values.

Aspect 17: The method of any of Aspects 1 through 16, wherein the PHR MAC-CE is determined per CORESET pool index value for the one or more CORESET pool index values, wherein the PHR MAC-CE is associated with a first CORESET pool index value or a second CORESET pool index value, and wherein a triggering of the PHR MAC-CE and a reporting of the PHR MAC-CE is separately determined at the UE.

Aspect 18: The method of any of Aspects 1 through 17, wherein the PHR MAC-CE is determined for the one or more CORESET pool index values, and a CORESET pool index value associated with a PHR field in the PHR MAC-CE is determined per uplink component carrier in the one or more uplink component carriers, wherein a different CORESET pool index value is associated with each PHR field in the PHR MAC-CE, wherein a first PHR field corresponding to a first uplink component carrier is for a first CORESET pool index value, and a second PHR field corresponding to a second uplink component carrier is for a second CORESET pool index value, and wherein a triggering of the PHR MAC-CE and a reporting of the PHR MAC-CE is jointly determined at the UE.

Aspect 19: The method of any of Aspects 1 through 18, wherein the PHR MAC-CE is determined for the one or more CORESET pool index values, wherein the PHR MAC-CE includes two PHR fields for an uplink component carrier that is associated with two CORESET pool index values, and wherein a triggering of the PHR MAC-CE and a reporting of the PHR MAC-CE is jointly determined at the UE.

Aspect 20: The method of any of Aspects 1 through 19, wherein the one or more CORESET pool index values include one or more of a first value or a second value, and wherein the first value corresponds to a first transmit-receive point and the second value corresponds to a second transmit-receive point.

Aspect 21: The method of any of Aspects 1 through 20, wherein detecting the occurrence of the triggering event comprises: detecting an expiry of a periodic timer or a prohibit timer; detecting a power change that satisfies a defined threshold for a pathloss reference signal used for power control for the one or more uplink component carriers; detecting an activation of the one or more uplink component carriers; or detecting that an active bandwidth part of a configured uplink component carrier is changed from a dormant state to a non-dormant state.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:
one or more transceivers;
one or more memories comprising instructions; and
one or more processors configured to execute the instructions and cause the UE to:
detect an occurrence of a triggering event associated with power headroom reporting, the triggering event corresponding to one or more uplink component carriers of the UE that are associated with one or more control resource set (CORESET) pool index values, wherein each of the one or more CORESET pool index values is associated with a different transmit receive point (TRP); and
transmit, via the transceiver, a power headroom report (PHR) medium access control (MAC) control element (CE) based at least in part on the occurrence of the triggering event, wherein the PHR MAC-CE comprises a power headroom of each of the one or more uplink component carriers of the UE, and wherein a size of the PHR MAC-CE is based at least in part on a quantity of one or more uplink component carriers that are configured with two CORESET pool index values.

2. The UE of claim 1, wherein a single CORESET pool index value of the one or more CORESET pool index values is common to multiple uplink component carriers of the UE.

3. The UE of claim 1, wherein the PHR MAC-CE indicates an associated CORESET pool index value.

4. The UE of claim 1, wherein the PHR MAC-CE is transmitted on an uplink shared channel associated with a CORESET pool index value of the PHR MAC-CE.

5. The UE of claim 1, wherein the PHR MAC-CE is transmitted on an uplink shared channel that is not associated with a CORESET pool index value of the PHR MAC-CE.

6. The UE of claim 1, wherein the one or more processors are further configured to cause the UE to:
perform uplink transmissions based at least in part on time division multiplexing of uplink shared channels in the one or more uplink component carriers.

7. The UE of claim 1, wherein a PHR field in the PHR MAC-CE is associated with an actual PHR or a virtual PHR; and
the one or more CORESET pool index values to be associated with the PHR field in the PHR MAC-CE are based at least in part on whether the PHR field in the PHR MAC-CE is associated with the actual PHR or the virtual PHR.

8. The UE of claim 1, wherein the PHR MAC-CE is based at least in part on:
the one or more CORESET pool index values to be associated with a PHR field in the PHR MAC-CE; and
the PHR field in the PHR MAC-CE is associated with one of an actual PHR or a virtual PHR, wherein whether the PHR field in the MAC-CE is associated with the one of the actual PHR or the virtual PHR is based at least in part on the one or more CORESET pool index values to be associated with the PHR field in the PHR MAC-CE.

9. The UE of claim 1, wherein at least one of:
the PHR MAC-CE is transmitted on a first uplink shared channel in a first uplink component carrier of the one or more uplink component carriers, and a first PHR field associated with the first uplink component carrier is an actual PHR field, or
a presence of a second uplink shared channel in a second uplink component carrier of the one or more uplink component carriers in a same slot as the first uplink shared channel indicates that a second PHR field of the PHR MAC-CE corresponding to the second uplink component carrier is an actual PHR field, or
a lack of the second uplink shared channel in the second uplink component carrier in the same slot as the first uplink shared channel indicates that the second PHR field of the PHR MAC-CE corresponding to the second uplink component carrier is a virtual PHR field;
and wherein
the virtual PHR field is associated with a first CORESET pool index value, wherein the first CORESET pool index value is based at least in part on a set of reference parameters, or
the virtual PHR field is associated with a same CORESET pool index value that is associated with the first uplink shared channel.

10. The UE of claim 1, wherein at least one of:
the PHR MAC-CE is transmitted on a first uplink shared channel in a first uplink component carrier of the one or more uplink component carriers, and a first PHR field associated with the first uplink component carrier is an actual PHR field, or
a CORESET pool index value of a second PHR field of the PHR MAC-CE corresponds to a CORESET pool index value of the first uplink shared channel, and at least one of:
the second PHR field is an actual PHR field based at least in part on a presence of a second uplink shared channel in a second uplink component carrier of the one or more uplink component carriers in a same slot as the first uplink shared channel that is associated with the CORESET pool index value, or
the second PHR field is a virtual PHR field based at least in part on a lack of the second uplink shared channel in the second uplink component carrier in the same slot as the first uplink shared channel that is associated with the CORESET pool index value.

11. The UE of claim 1, wherein the PHR MAC-CE indicates a first CORESET pool index value of the one or more CORESET pool index values for a first uplink component carrier or a second CORESET pool index value of the one or more CORESET pool index values for a second uplink component carrier.

12. The UE of claim 1, wherein the one or more processors are further configured to cause the UE to:
perform uplink transmissions based at least in part on frequency division multiplexing or spatial division multiplexing of uplink shared channels in the one or more uplink component carriers.

13. The UE of claim 1, wherein the PHR MAC-CE further comprises a bitmap indicating that a PHR is associated with the one or more uplink component carriers or the one or more CORESET pool index values, and at least one of:
the bitmap includes one bit to indicate that the PHR corresponds to a single uplink component carrier, or
the bitmap includes two bits to indicate that the PHR is corresponds to separate CORESET pool index values of the one or more CORESET pool index values.

14. The UE of claim 1, wherein:
the transmission of the PHR MAC-CE is triggered separately for separate CORESET pool index values of the one or more CORESET pool index values; or
the transmission of the PHR MAC-CE is triggered jointly across multiple CORESET pool index values.

15. The UE of claim 1, wherein at least one of:
the PHR MAC-CE is based at least in part on each CORESET pool index value for the one or more CORESET pool index values,
the PHR MAC-CE is associated with a first CORESET pool index value or a second CORESET pool index value of the one or more CORESET pool index values, or
a triggering of the PHR MAC-CE and a reporting of the PHR MAC-CE is separately triggered at the UE.

16. The UE of claim 1, wherein:
the PHR MAC-CE is based at least in part on the one or more CORESET pool index values, and
a CORESET pool index value associated with a PHR field in the PHR MAC-CE is based at least in part on a per uplink component carrier basis of the one or more uplink component carriers, and:
a different CORESET pool index value is associated with each PHR field in the PHR MAC-CE, and:
a first PHR field corresponding to a first uplink component carrier is for a first CORESET pool index value, and
a second PHR field corresponding to a second uplink component carrier is for a second CORESET pool index value, and:
a triggering of the PHR MAC-CE and a reporting of the PHR MAC-CE are jointly triggered at the UE.

17. The UE of claim 1, wherein:
the PHR MAC-CE is based at least in part on the one or more CORESET pool index values, wherein:
the PHR MAC-CE includes two PHR fields for an uplink component carrier that is associated with two CORESET pool index values, and:
a triggering of the PHR MAC-CE and a reporting of the PHR MAC-CE are jointly triggered at the UE.

18. The UE of claim 1, wherein:
the one or more CORESET pool index values include one or more of a first value and a second value, and:
the first value corresponds to a first transmit-receive point and the second value corresponds to a second transmit-receive point.

19. The UE of claim 1, wherein the one or more processors, when detecting the occurrence of the triggering event, are configured to cause the UE to:
- detect an expiry of a periodic timer or a prohibit timer;
- detect a power change that satisfies a defined threshold for a pathloss reference signal used for power control for the one or more uplink component carriers;
- detect an activation of the one or more uplink component carriers; or
- detect that an active bandwidth part of a configured uplink component carrier is changed from a dormant state to a non-dormant state.

20. A method of wireless communication performed at a user equipment (UE), comprising:
- detecting an occurrence of a triggering event associated with power headroom reporting, the triggering event corresponding to one or more uplink component carriers of the UE that are associated with one or more control resource set (CORESET) pool index values, wherein the one or more CORESET pool index values are each associated with a different transmit receive point (TRP); and
- transmitting a power headroom report (PHR) medium access control (MAC) control element (CE) based at least in part on the occurrence of the triggering event, wherein the PHR MAC-CE comprises a power headroom of each of the one or more uplink component carriers of the UE, wherein a size of the PHR MAC-CE is based at least in part on a quantity of uplink component carriers that are configured with two CORESET pool index values.

21. The method of claim 20, wherein:
- a single CORESET pool index value of the one or more CORESET pool index values is common to multiple uplink component carriers of the UE;
- the PHR MAC-CE indicates an associated CORESET pool index value.

22. The method of claim 20, wherein transmitting the PHR MAC-CE comprises:
- transmitting the PHR MAC-CE on an uplink shared channel that is not associated with a CORESET pool index value of the PHR MAC-CE.

23. A non-transitory computer-readable medium storing a set of instructions for wireless communication, the set of instructions comprising:
- one or more instructions that, when executed by one or more processors of a user equipment (UE), cause the UE to:
  - detect an occurrence of a triggering event associated with power headroom reporting, the triggering event corresponding to one or more uplink component carriers of the UE that are associated with one or more control resource set (CORESET) pool index values, wherein the one or more CORESET pool index values are each associated with a different transmit receive point (TRP); and
  - transmit a power headroom report (PHR) medium access control (MAC) control element (CE) based at least in part on the occurrence of the triggering event, wherein the PHR MAC-CE comprises a power headroom of each of the one or more uplink component carriers of the UE, wherein a size of the PHR MAC-CE is based at least in part on a quantity of uplink component carriers that are configured with two CORESET pool index values.

24. The non-transitory computer-readable medium of claim 23, wherein:
- a single CORESET pool index value of the one or more CORESET pool index values is common to multiple uplink component carriers of the UE; or
- the PHR MAC-CE indicates an associated CORESET pool index value.

25. The non-transitory computer-readable medium of claim 23, wherein the one or more instructions, that cause the UE to transmit the PHR MAC-CE, cause the UE to:
- transmit the PHR MAC-CE on an uplink shared channel associated with a CORESET pool index value of the PHR MAC-CE.

26. A user equipment (UE), comprising:
- means for detecting an occurrence of a triggering event associated with power headroom reporting, the triggering event corresponding to one or more uplink component carriers of the UE that are associated with one or more control resource set (CORESET) pool index values, wherein the one or more CORESET pool index values are each associated with a different transmit receive point (TRP); and
- means for transmitting a power headroom report (PHR) medium access control (MAC) control element (CE) based at least in part on the occurrence of the triggering event, wherein the PHR MAC-CE comprises a power headroom of each of the one or more uplink component carriers of the UE, wherein a size of the PHR MAC-CE is based at least in part on a quantity of uplink component carriers that are configured with two CORESET pool index values.

27. The UE of claim 26, wherein:
- a single CORESET pool index value of the one or more CORESET pool index values is common to multiple uplink component carriers of the UE;
- the PHR MAC-CE indicates an associated CORESET pool index value.

28. The UE of claim 26, wherein the means for transmitting the PHR MAC-CE comprises:
- means for transmitting the PHR MAC-CE on an uplink shared channel that is not associated with a CORESET pool index value of the PHR MAC-CE.

29. The method of claim 20, wherein the PHR MAC-CE indicates a first CORESET pool index value of the one or more CORESET pool index values for a first uplink component carrier or a second CORESET pool index value of the one or more CORESET pool index values for a second uplink component carrier.

30. The method of claim 20, wherein detecting the occurrence of the triggering event further comprises:
- detecting an expiry of a periodic timer or a prohibit timer;
- detecting a power change that satisfies a defined threshold for a pathloss reference signal used for power control for the one or more uplink component carriers;
- detecting an activation of the one or more uplink component carriers; or
- detecting that an active bandwidth part of a configured uplink component carrier is changed from a dormant state to a non-dormant state.

* * * * *